United States Patent [19]

Talmi

[11] 4,259,014
[45] Mar. 31, 1981

[54] FIBER OPTIC POLYCHROMATOR

[75] Inventor: Yair Talmi, Plainsboro, N.J.

[73] Assignee: Princeton Applied Research Corporation, Princeton, N.J.

[21] Appl. No.: 26,605

[22] Filed: Apr. 3, 1979

[51] Int. Cl.³ .............................................. G01J 3/20
[52] U.S. Cl. ................................................. 356/328
[58] Field of Search ............... 356/310, 326, 328, 331, 356/334; 350/168

[56] References Cited

U.S. PATENT DOCUMENTS

| | | | |
|---|---|---|---|
| 3,191,487 | 6/1965 | Kruythoff et al. | 350/168 |
| 3,554,649 | 1/1971 | Ridgway | 356/334 |
| 3,728,029 | 4/1973 | Hirschield | 356/308 |
| 3,880,523 | 4/1975 | Thomas | 356/310 |
| 4,012,147 | 3/1977 | Walrafen | 356/326 |
| 4,054,389 | 10/1977 | Owen | 356/332 X |

OTHER PUBLICATIONS

Combes et al., *Applied Optics*, vol. 7, No. 5, May 1968, pp. 857–859.
Loseke et al., *Applied Spectroscopy*, vol. 25, No. 1, 1971, pp. 64–70.
Jamar, *Nouv. Rev. Optique*, t. 7, No. 1, Jan.–Feb. 1976, pp. 53–56.

*Primary Examiner*—F. L. Evans
*Attorney, Agent, or Firm*—Finnegan, Henderson, Farabow, Garrett & Dunner

[57] ABSTRACT

An optical fiber polychromator for separating light radiation into spectral bands which can be simultaneously displayed in a stacked, two-dimensional non-overlapping arrangement. Light radiation is directed through entrance slits into a Rowland Circle spectrometer apparatus by optical fibers which are arranged at discrete locations on an entrance focal plane. The radiation is separated into spectral windows or bands which are focused in parallel onto the target of a vidicon detector. The discrete entrance locations are defined in accordance with column and row coordinates of a matrix in the entrance focal plane wherein the column and row coordinates are separated by predetermined distances dependent upon the dimensions of the detector target and the entrance slits. The entrance locations are arranged so that no two locations have the same row or column coordinate whereby the desired parallel, non-overlapping distribution of spectral bands is achieved.

35 Claims, 5 Drawing Figures

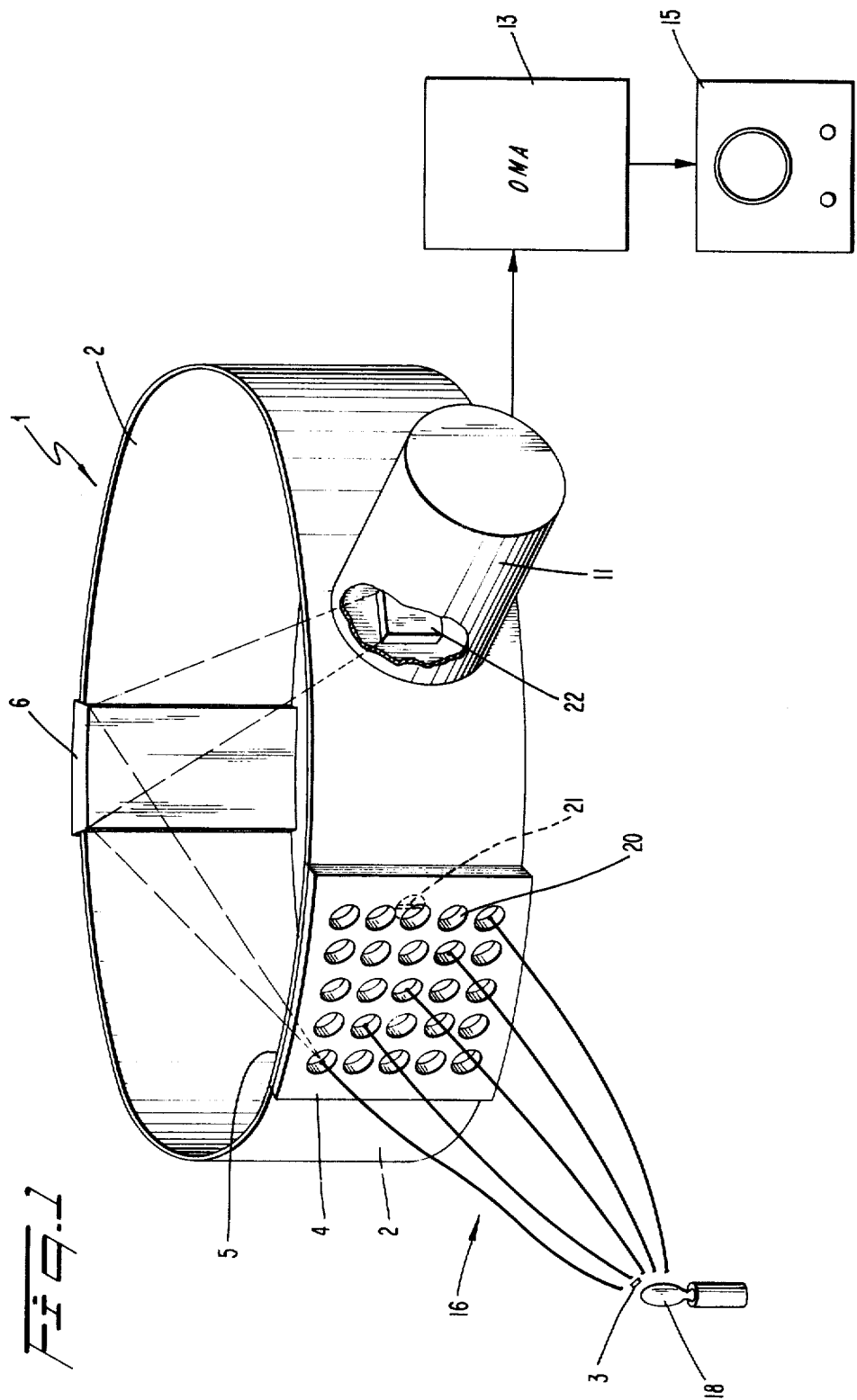

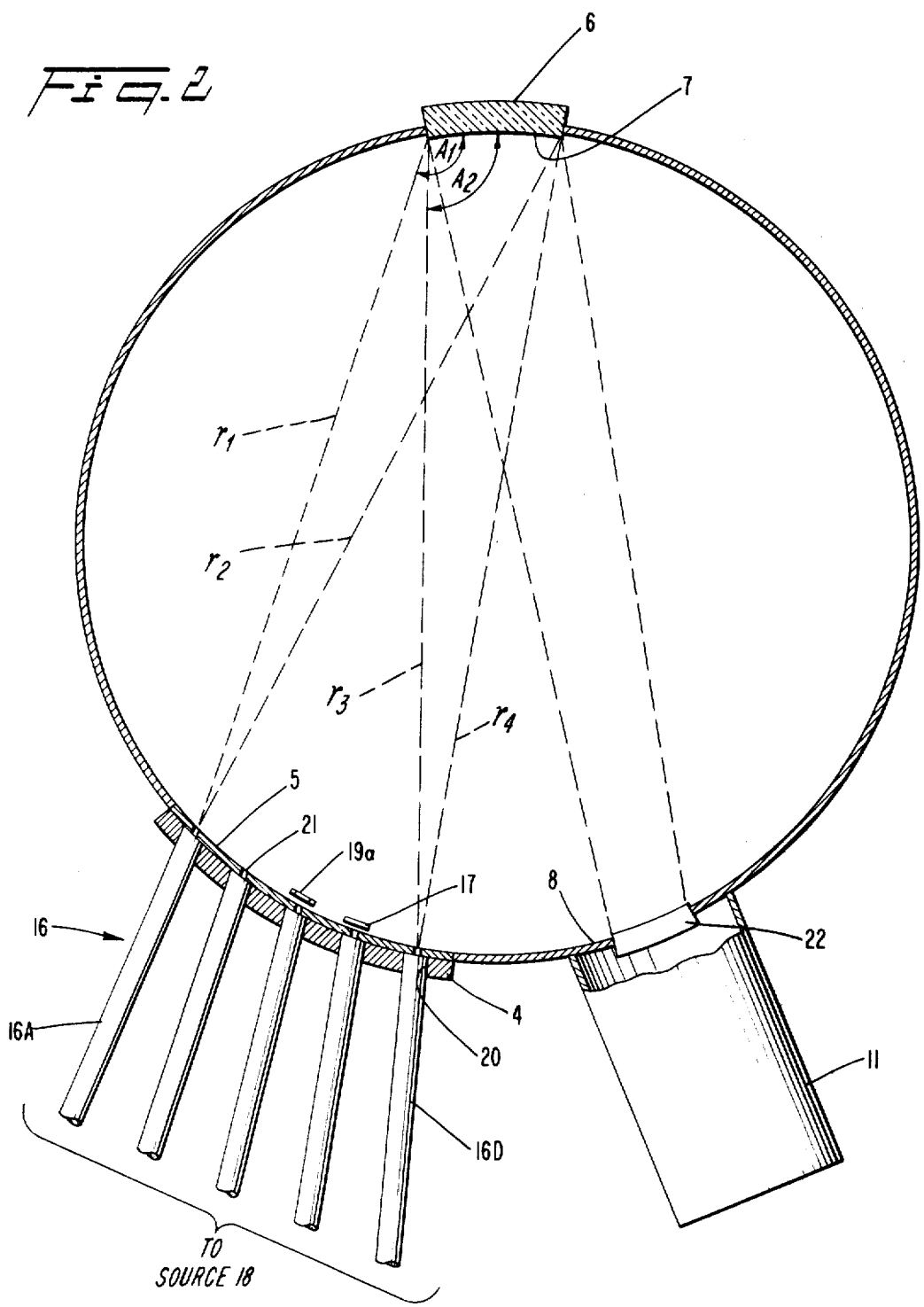

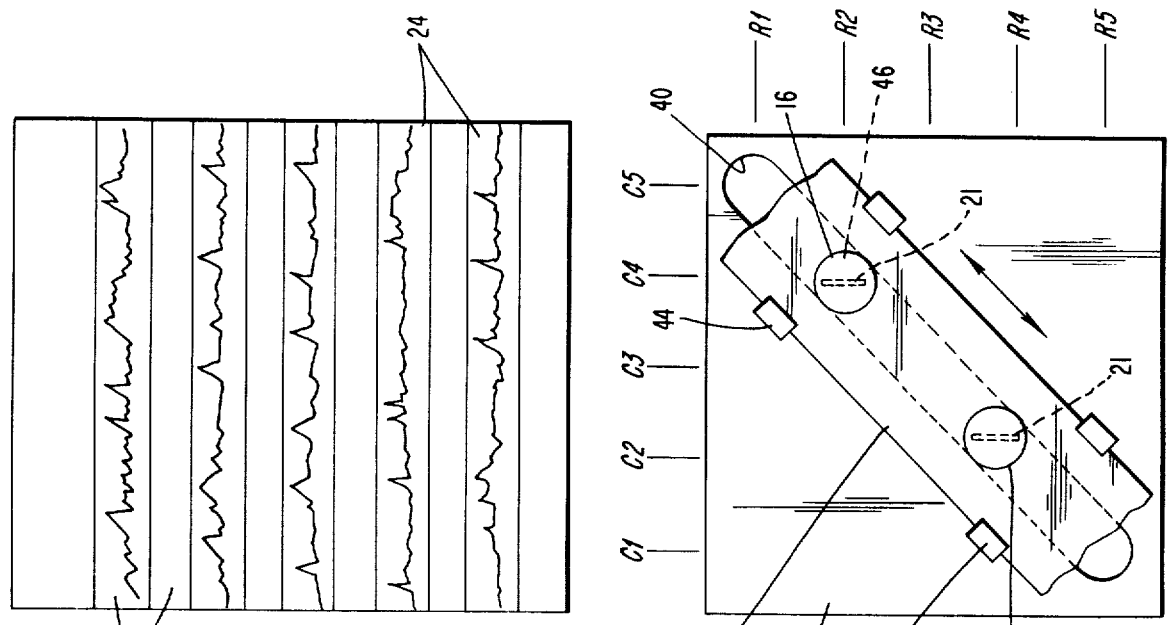
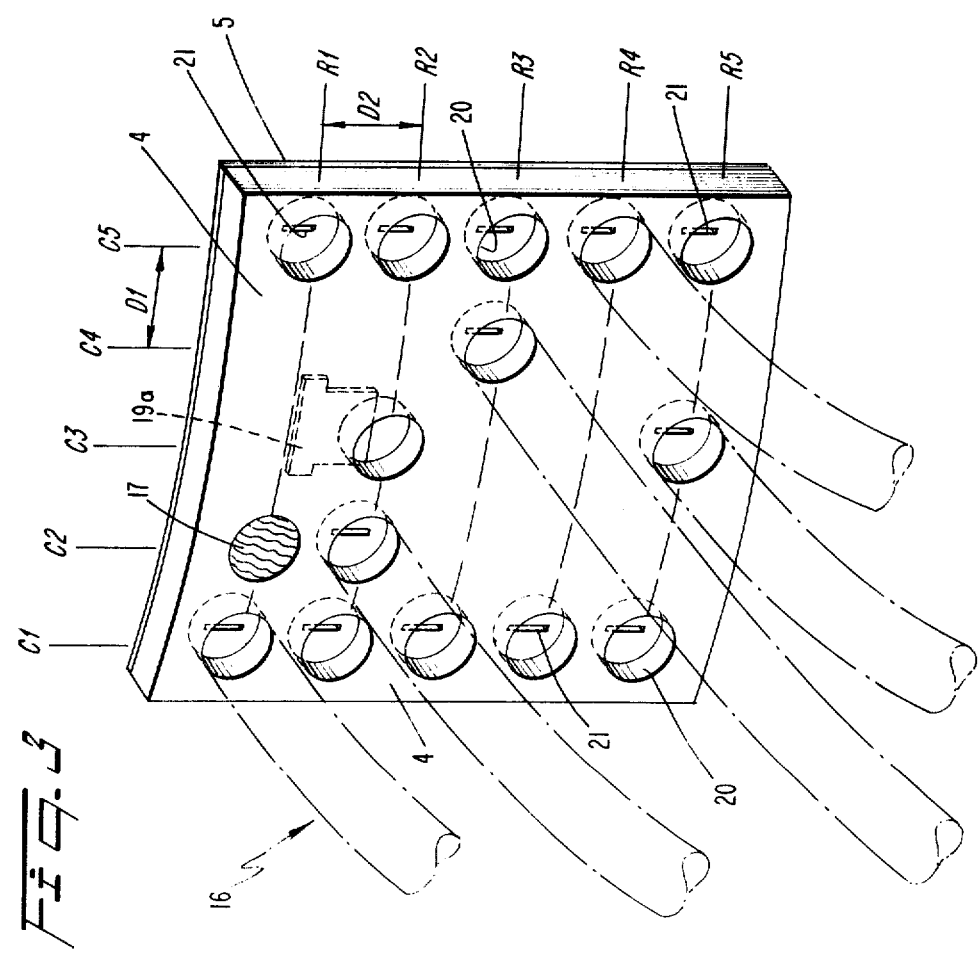

FIBER OPTIC POLYCHROMATOR

BACKGROUND OF THE INVENTION

The present invention relates to a spectrometer apparatus for separating light radiation into a plurality of spectral bands and, more particularly, to a fiber optic polychromator employing optoelectronic detector means for performing multi-element spectral analysis.

Multielement analysis requires a wide range of spectra to be covered simultaneously as emissions from multielement samples commonly span the ultraviolet and the infrared spectral regions. Various types of spectrometers and polychromators are useful in this work, particularly those having multientrance slit arrangements. In one proposed arrangement light radiation is guided to each of a series of horizontally spaced entrance slits of a polychromator by optical fibers. These fibers are commonly made of glass or quartz and one end of each optical fiber can be selectively positioned near a light source while the other end can be aligned with any one of the entrance slits to guide radiation from a selected part of the light source to the polychromator for separation into a spectral bands. (defined here as the spectral region simultaneously covered by the detector). In this proposed use of optical fibers with a horizontal arrangement of spaced entrance slits, an optoelectronic multichannel vidicon detector may be employed. One such vidicon may be, for example, an "OMA" silicon intensified target (SIT) detector described in catalogue No. T388-15M-5/78-CP published by Princeton Applied Research Corp., Princeton, N.J. Such a vidicon detector generally includes a two-dimensional photosensor target and an electron gun for effecting a target readout scan.

In using optical fibers with multiple entrance slits, each entrance slit may operate to focus a particular spectral region or band (e.g., 40 nm.) on the vidicon target. Numerous advantages are realized by use of such a multi-slit arrangement. The use of optical fibers lends flexibility to the collection of radiation. The source end of an optical fiber can be located at any position adjacent a light source to gather the desired radiation while the other end of the fiber can be inserted into any of the multiple entrance slits to display the desired spectral band.

A problem inherent in this form of spectrometer, however, is that it provides only a one-dimensional display of spectra whereupon overlapping of spectra occurs when more than one optical fiber is inserted into the entrance slit arrangement. Analysis of overlapping spectra is both difficult and generally inaccurate. Another disadvantage is that such a one-dimensional display of spectra does not result in an efficient use of the two-dimensional vidicon target, which is a potentially powerful tool for multielement trace analysis.

One known form of spectrometer system known as the "echelle-crossed dispersion" system is capable of displaying spectral bands in a two-dimensional configuration. This system, however, employs complex optics and does not display the spectra in parallel bands. Furthermore, the bands are non-uniform in size which makes detection difficult and inefficient since large portions of the target are not utilized. Also separation between parallel bands is not uniform. Resolution also varies across the spectra in this type of system and furthermore in order to utilize optoelectronic detector apparatus the non-parallel display of bands calls for a complex computer-controlled detector system and constitutes an inherently inefficient use of the two-dimensional vidicon target. Furthermore, this system is notorious for its high stray light levels, a direct result of the optical design and configuration.

SUMMARY OF THE INVENTION

It is accordingly an object of the invention to provide an apparatus for separating light radiation into spectral bands or windows which can be displayed on a two-dimensional multi-channel detector target without overlap. Alternatively, a stack of linear photosensor arrays, e.g., photodiodes, can be placed (one above the other).

Another object is to utilize, in apparatus of the type described, optical fibers with multiple entrance slits to obtain a wideband optical spectrum which is reliable and easy to analyze.

Additional objects and advantages of the invention will be set forth in part in the description which follows, and in part will be apparent from the description, or may be learned by practice of the invention. The objects and the advantages of the invention may be realized and attained by means of the instrumentalities and combinations particularly pointed out in the appended claims.

To achieve the foregoing objects and in accordance with the purpose of the invention, as embodied and broadly described herein, there is provided an optical fiber polychromator comprising: an optical arrangement including entrance means for admitting light radiation into an entrance focal plane, (the word "plane" is freely used throughout to more generally mean "surface") display means located at a predetermined exit focal plane, and spectrum means for separating the light radiation into spectral components determined by the position at which the radiation is admitted into the entrance plane and for focusing the spectral components on the display means; a plurality of optical fibers, each of which has one end positioned near a light source and the other end positioned adjacent to the entrance focal plane for guiding radiation to the entrance plane; and means included in the entrance means for retaining the ends of the optical fibers nearest the entrance focal plane in any one of a plurality of locations in a predetermined array, each of the locations in the array being defined by column and row coordinates of a fixed rectilinear matrix located in the entrance focal plane, the column and row coordinates being separated by predetermined distances and the optical fibers being retained at locations of the array so that no two of the fibers are aligned with the same row or column coordinate, whereby radiation admitted by the fibers is displayed at the exit plane in non-overlapping spectral bands.

Further, the optical fiber polychromator may comprise means included in the entrance means for slidably retaining the ends of the fibers for movement parallel to the entrance focal plane so that the fibers can be moved to different locations in the array to adjust the positions of the parallel spectral bands on the display means.

The slidable retaining means may also include a diagonally disposed track positioned adjacent to the entrance focal plane and means for mounting the optical fibers for movement along the track to permit the positioning of the fibers at the different array locations.

BRIEF DESCRIPTION OF THE DRAWINGS

The accompanying drawings which are incorporated in and constitute a part of the specification, illustrate embodiments of the invention and, together with the description, serve to explain the principles of the invention.

In the drawings:

FIG. 1 is a schematic diagram, in perspective, of a preferred embodiment of an optical fiber polychromator constructed in accordance with the teachings of the invention;

FIG. 2 is a plan view of the optical fiber polychromator shown in FIG. 1.

FIG. 3 is a schematic diagram illustrating the multi-slit entrance plate for retaining the optical fibers in the apparatus of FIGS. 1 and 2.

FIG. 4 is a schematic diagram illustrating the display of spectral bands or windows as produced by the arrangement of optical fibers shown in FIG. 3.

FIG. 5 is a schematic diagram showing a further preferred embodiment of the multi-slit entrance plate including a slot diagonally disposed across the entrance focal plane for slidably guiding a plurality of optical fibers for movement to different points in the entrance focal plane.

DETAILED DESCRIPTION OF PREFERRED EMBODIMENTS

Reference will now be made in detail to preferred embodiments of the invention, which are illustrated in the accompanying drawings.

Referring to FIG. 1, the spectrometer or polychromator of the invention employs a Rowland Circle spectrometer apparatus 1 (see "The Optical Industry and System Directory-Encyclopedia", P.E-281, 1978) including a cylindrical sidewall 2 defining an optical chamber. A multi-slit entrance plate 4 defining an entrance focal plane, a diffraction grating 6, and a detector element 22 defining an exit focal plane are supported on the sidewall 2 to provide a dispersive optical path between the entrance plane and exit plane. Detector element 22 may comprise the target of an optoelectronic detector 11 which is coupled to an optical multi-channel analyzer (OMA) 13. The latter may be, for example, of the type previously noted as described in Princeton Applied Research Corp. Catalog No. T388-15M-5/78-CP.

A plurality of optical fibers 16 are provided to guide light radiation from a source 18 to the multi-slit entrance plate 4. One end of each of optical fibers 16 is positioned adjacent to light source 18 while the other end is inserted into one of a plurality of retaining apertures 20 provided in the entrance plate 4. An entrance slit 21 is provided at each aperture 20 in a slit plate mounted on the inside surface of the plate 4 in the entrance focal plane.

Optical fibers 16 thus direct radiation from the source 18 to the mirror and dispersion grating 6 whereupon the radiation is separated into spectral bands or windows which are focused on the vidicon detector 22. OMA 13 is connected to a display device 15 such as an oscilloscope which provides a visual readout in the form of, for example, a plot of radiation intensity vs. wavelength to enable multielement analysis.

In accordance with the invention, the optical fiber polychromator includes entrance means for admitting light radiation into an entrance focal plane. As embodied herein, the entrance means, better shown in FIG. 2, includes the multi-slit entrance plate 4 including the optical fiber retaining apertures 20 and plate 5 providing entrance slits 21. In the Rowland Circle apparatus shown, plate 4 is positioned on the circumference of the cylindrical sidewall which defines the entrance focal plane for the apparatus. As is apparent from FIG. 2, light radiation from source 18 is admitted into the entrance focal plane via the slits 21 and is directed to the concave diffraction grating 6. The grating 6 separates the incident radiation into spectral components and focuses a spectral band covering a defined spectral window, e.g., 40 nm, onto the detector element 22. (The radius of the concave grating is equal to the diameter of the Rowland Circle).

In accordance with the invention, display means are located at a predetermined exit focal plane. As here embodied, and shown in FIGS. 1 and 2, display means includes detector target 22 located at exit focal plane 8 of the Rowland Circle apparatus. Detector target 22 is part of the vidicon detector 11 which is coupled to OMA 13. Referring to the end-most optical fibers 16A and 16D, radiation is directed from source 18 through the fibers and passes through entrance slits 21 provided in slit plate 5. The path of radiation is shown by dashed lines in FIG. 2 as $r_1$-$r_2$ and $r_3$-$r_4$. Radiation travels from the slits 21 to the concave diffraction grating 6 and is thereby focused as discrete spectral bands (not shown in FIG. 2) on detector target 22. The arrangement of spectral bands on detector target 22 is a significant feature of the invention and is described in greater detail below.

The invention further includes spectrum means for separating radiation into spectral components determined by the position at which the radiation is admitted into the entrance focal plane and for focusing the spectral components on the display means. As embodied herein and shown in FIGS. 1 and 2, the spectrum means includes the concave diffraction grating 6 which separates radiation incident upon surface 7 of the grating into spectral components. As described above, radiation directed by optical fibers 16A and 16D travels to dispersion grating 6 along paths $r_1$-$r_2$ and $r_3$-$r_4$. This radiation is separated into spectral components in accordance with the angle at which the radiation is incident upon the dispersion grating. It is apparent from following paths $r_1$-$r_2$ and $r_3$-$r_4$ that the radiation directed by optical fibers 16A and 16D interacts with the dispersion grating 6 at different angles of incidence. (The relationship between grating grooves and incident and diffraction angles, $\alpha$ and $\beta$ correspondingly, obey the well known grating equation: $m\lambda = a(\sin \alpha \pm \sin \beta)$ where a is the grooves spacing, $\lambda$ the wavelength and m the diffraction order).

Thus, the spectral components included in the radiation focused on the detector target 22 from fiber 16A will span a different range of wavelengths than the radiation focused on the target from the fiber 16D. Each spectral band will include a window of, for example, 40 nm. within the overall spectral range of the system. Each of the fibers 16 shown in FIG. 2 thus accounts for a particular spectral window.

Still further in accordance with the invention, the optical fiber polychromator includes a plurality of optical fibers, each of the optical fibers having one end for positioning near a light source and the other end positioned adjacent to the entrance focal plane for guiding radiation to the focal plane. As embodied herein and shown in FIGS. 1 and 2, the optical fibers 16 are positioned near light source 18 to guide emitted radiation to the entrance focal plane which is coincident with slit plate 5. Optical fibers 16 can be moved to different positions around the light source to selectively gather particular radiation desired for analysis. Individual lenses 3 may be mounted on the ends (at the light source) of the optical fibers to enhance their light-collecting capacity. Also, spectral filters 17 may be inserted into the paths of the fibers to adjust the spectral content of the collected radiation if desired.

The other end of each optical fiber 16 is retained in entrance plate 4 adjacent to the entrance focal plane to direct radiation to that focal plane. As shown in FIG. 2, the optical fibers are inserted into apertures 20 of plate 4 adjacent to slit plate 5 which is coincident with the entrance focal plane. The slit plate 5 provides a slot 21 in alignment with each of the apertures 20.

The optical fiber polychromator of the invention further comprises means included in the entrance means for retaining the end of each of the optical fibers nearest the entrance plane in any one of a plurality of locations in a predetermined array, each of the locations in the array being defined by column and row coordinates of a fixed rectilinear matrix located in the entrance focal plane, the column and row coordinates being separated by predetermined distances and the optical fibers being retained at locations of the array so that no two of the fibers are aligned with the same row or column coordinate, whereby radiation admitted by the fibers is displayed at the exit plane in parallel non-overlapping spectral bands. As embodied herein and shown in FIG. 3, the retaining means includes the apertures 20 in entrance plate 4. Each of the apertures occupies a particular location in a predetermined array defined by the row and column coordinates of a rectilinear matrix located in the focal plane. An aperture 20 and slit 21 are aligned with each R-C (row-column) coordinate point of the matrix. The column coordinates are separated by a predetermined distance D1 and row coordinates are separated by a predetermined distance D2. Behind each slit (inside spectrometer) it is possible to place either/or a spectral-filter 17 (FIGS. 2 & 3) or a light-shutter 19a (FIGS. 2 & 3). The spectral filter will exclude any unwanted radiation of wavelength not included in the corresponding band. The shutter will eliminate the light input (when necessary) from the corresponding optical fiber.

Referring to FIGS. 3 and 4, the relationship between the location of optical fibers 16 in entrance plate 4 and the display of spectral bands on detector target 22 can be understood. FIG. 4 is a schematic diagram showing the displayed spectral bands 24 (in a typical OMA display mode) corresponding to the five optical fibers 16 shown in FIG. 3. The bands are presented in a non-overlapping "stacked" configuration whereby the spectral information embodied in the bands can be interpreted simultaneously and without ambiguity or interference.

The top band 24 is produced by the radiation from the optical fiber located at the C1-R1 position in the entrance plate aperture array. The second band is produced by the C2-R2 fiber, the third band by the C4-R3 fiber, the fourth band by the C5-R4 fiber, and the bottom band by the C3-R5 fiber. The spectral window presented in each band depends on the column position occupied by the associated optical fiber. The reason the bands are displayed in the stacked, non-overlapping arrangement with discrete spectral windows as represented in FIG. 4 is that no two of the optical fibers are aligned with the same row or column coordinate. In other words, no column or row of the array has more than one optical fiber. If it is desired to have redundant spectral windows, such as to examine or compare different portions of the same source, more than one fiber can be placed in a single column, but in different rows to avoid overlapping displays.

The center-to-center distance between the column coordinates in the aperture array (i.e., D1 in FIG. 3) should be made equal to the horizontal dimension of the detector target 22 in order to cover the full spectrum without leaving wavelength gaps and to avoid repeating wavelengths. Thus, if a 10 mm. × 10 mm. detector is used, the spacing between column coordinates should be 10 mm. The distance between row coordinates (i.e., D2 in FIG. 3) is selected in accordance with the number of tracks available on the detector target and the height of the entrance slits. Thus, if the entrance slits are 1 mm. high, and it is desired to pack a large number of bands onto the detector target, the center-to-center distance between row coordinates should be set at approximately 1½ mm. This will allow ½ mm. vertical spacing between slits to avoid band interference and will permit full utilization of the capacity of the detector. The width of the slits is selected in accordance with the type of radiation to be analyzed and the spectral resolution sought. Typically, the slits will be between 10 um. and 1 mm. in width.

The fibers 16 can be "plugged" into any combination of retaining apertures 20, like telephone jacks into a switchboard, to produce any desired ordered sequence of non-overlapping spectral bands, so long as no two fibers have the same row or column coordinate. A linear diagonal arrangement of fibers, such as is shown in FIG. 1, will produce vertically stacked, sequentially arranged spectral windows on the display. Unused apertures 20 should be closed by inserting a plug so that unwanted radiation from the light source does not enter the optical chamber.

The parallel display of bands results in a highly efficient utilization of the vidicon detector 11 used to read out the bands and generate a corresponding oscilloscope display and/or to store in computer memory the spectra for further data processing. The representation of the bands shown in FIG. 4 represents an oscilloscope plot of radiation intensity vs. wavelength corresponding to the presentation of spectral bands on the detector target 22. Each spectral band on the detector is made up of a series of spectral lines representing the presence of certain wavelength components. Since the readout electron beam of the vidicon scans the target in a direction parallel to the bands, maximum utilization of the detector sensor array is achieved.

As further provided in accordance with the invention, the entrance means may include means for slidably retaining the entrance plane ends of the optical fibers for movement parallel to the entrance plane so that the fibers can be moved to different locations in the entrance array to adjust the positions of the parallel spectral bands and to select different spectral windows for display. In this embodiment the slidable retaining means, shown in FIG. 5, includes a slot 40 provided in entrance plate 4 in place of the apertures 20. The slot runs diagonally across the entrance focal plane from the top to the bottom thereof and functions as a guide track for the ends of the optical fibers 16 inserted therein. Two fibers 16 are shown, but additional ones may be provided, depending on the number of bands to be displayed.

A cover plate 42 retains the optical fibers in spaced relation and is slidably supported on the surface of entrance plate 4 by the brackets 44. In addition to functioning as a part of the slide assembly, the cover plate 42 prevents stray light from entering the optical chamber through the slot 40. In the embodiment shown in FIG. 5, the aperture means for providing the entrance slits 5 comprises a slit plate affixed to the entrance plane end of each of the optical fibers. As specifically embodied, each slit plate 46 including an entrance slit 21 is mounted directly on the flat end of the fiber whereupon the slit moves with the fiber. With this arrangement it is possible to position the entrance slits at any of the row-column coordinate point locations along the axis of slot 40 and at any locations therebetween. This permits continuous selection of the spectral windows to be displayed.

Thus, the apparatus of the invention as herein described, constitutes a new type of polychromator which also may be described as a fiber optic vidicon spectrometer. The polychromator is specifically designed to operate with optoelectronic multichannel detectors and is a unit which is no larger in size than a conventional atomic absorption spectrometer. It offers the advantages of wide wavelength coverage and flexibility. Each entrance slit focuses a particular 40 nm. spectral region on the SIT vidicon target. Since the individual fiber optic bundles can be "plugged" into the retaining apertures in the entrance plate, any spectral window within the range of the apparatus may be selected for display. Those retaining apertures and slits not in use can be blocked with small opaque plugs. Further, an individual input lens may be employed at the end of each fiber optic strand to enhance collection of radiation from the source. Each individual lens, along with its fiber, may be positioned to observe the optimum region of the source in accordance with the desired elemental analysis.

The system enables simultaneous monitoring of spectra spanning a few hundred nm. with a spectral resolution better than 0.01 nm. By plugging the fiber optic strands into different retaining apertures, individual spectral lines can be moved to different desired positions on the detector target to exclude undesired flame bands. The stacked format in which the spectral bands are displayed is an extremely efficient match to the two-dimensional readout format of the silicon-vidicon detector employed in the OMA. This allows the entire atomic spectral range of interest, typically 190 to 500 nm., to be simultaneously monitored with excellent resolution. Since the optics of the system are extremely simple, economical, and reliable operation is achieved.

While the invention has been particularly shown and described with reference to preferred embodiments thereof, it will be understood by those skilled in the art that the above and other changes in form and details may be made therein without departing from the spirit and scope of the invention.

What is claimed is:

1. An optical fiber polychromator comprising:
an optical arrangement including entrance means for admitting light radiation into an entrance focal plane, display means located at a predetermined exit focal plane, and spectrum means for separating said radiation into spectral components determined by the position at which said radiation is admitted into said entrance plane and for focusing said spectral components on said display means;
a plurality of optical fibers, each of said optical fibers having one end positioned near a light source and the other end positioned adjacent to said entrance focal plane for guiding radiation to said entrance plane; and
means included in said entrance means for retaining the end of each of said optical fibers nearest said entrance plane in any one of a plurality of locations in a predetermined array, each of said locations in said array being defined by column and row coordinates in a fixed rectilinear matrix located in said entrance focal plane, said column and row coordinates being separated by predetermined distances and said optical fibers being retained at locations of said array so that no two of said fibers are aligned within the same row, whereby radiation admitted by said fibers is displayed at said exit plane in parallel non-overlapping spectral bands.

2. The optical fiber polychromator set forth in claim 1 further comprising:
means included in said entrance means for slidably retaining said entrance plane ends of said fibers for movement parallel to said plane so that said fibers can be moved to different locations in said array to adjust the positions of said parallel spectral bands and to select different spectral windows for display.

3. The optical fiber polychromator set forth in claim 2 wherein said slidable retaining means includes a track disposed adjacent to said entrance focal plane and running diagonally across said plane and means for mounting said optical fibers for movement along said track to permit the positioning of said fibers at said different array locations.

4. The optical fiber polychromator set forth in claim 1 wherein said entrance means includes aperture means providing an entrance slit for each optical fiber and wherein said spectrum means includes dispersion means for focusing a selected range of spectral components on said display means for each said entrance slit.

5. The optical fiber polychromator set forth in claim 4 wherein said dispersion means comprises a Rowland Circle apparatus having cylindrical sidewall means supporting said entrance means and said display means at adjacent positions thereon and including means for separating radiation into spectral components supported on said sidewall means at a position opposite said entrance and display means.

6. The optical fiber polychromator set forth in claim 4 wherein said aperture means comprises a slit plate affixed to said entrance plane end of each of said optical fibers.

7. An optical fiber polychromator according to claim 4 wherein said predetermined distance between said row coordinates depends on the height of said entrance slits.

8. The optical fiber polychromator set forth in claim 1 wherein said display means includes an area-array optoelectronic image detector having a target element located at said exit focal plane.

9. The optical fiber polychromator according to claim 8 in which said predetermined distance between said column coordinates is dependent upon the width of said detector target.

10. The optical fiber polychromator according to claim 9 in which said predetermined distance between said column coordinates is equal to the width of said detector target.

11. The optical fiber polychromator set forth in claim 1, wherein said display means includes an optical-multichannel detector and data processing means.

12. The optical fiber polychromator set forth in claim 8, wherein said area-array optoelectronic image detector comprises at least one vidicon.

13. The optical fiber polychromator set forth in claim 1, wherein said display means includes a stack of linear photosensor arrays arranged in parallel, one above the other.

14. The optical fiber polychromator set forth in claim 13, wherein said linear photosensor arrays comprise photodiodes.

15. An optical fiber polychromator according to claim 1, including a plurality of spectral filters, with each of said filters being situated adjacent the end of one of said optical fibers nearest said entrance plane, said filters selectively excluding at least a portion of any radiation at wavelengths not included in the spectral band defined by the respective optical fiber.

16. An optical fiber polychromator according to claim 1, including a plurality of light shutters, with each of said shutters being situated adjacent the end of one of said optical fibers nearest said entrance plane for selectively stopping the light throughput of the respective optical fiber.

17. The optical fiber polychromator set forth in claim 16, wherein said light shutters comprise solenoid shutters.

18. The optical fiber polychromator set forth in claim 1, wherein the center-to-center distance between said column coordinates is equal to the horizontal dimension of said display means, and wherein said optical fibers are retained at locations of said array so that no two of said fibers are aligned within the same column.

19. A polychromator comprising:
an optical arrangement including entrance means for admitting light radiation into an entrance focal plane, display means located at a predetermined exit focal plane, and spectrum means for separating said radiation into spectral components determined by the position at which said radiation is admitted into said entrance plane and for focusing said spectral components on said display means;
light transmission means being adapted to transmit radiation from a light source to said entrance plane; and
means included in said entrance means for retaining each of a plurality of portions of said light transmission means nearest said entrance plane in any one of a plurality of locations in a predetermined array, each of said locations in said array being defined by column and row coordinates in a fixed rectiliner matrix located in said entrance focal plane, said column and row coordinates being separated by predetermined distances, the said portions of said light transmission means being retained at locations of said array so that no two of said portions are aligned with the same row coordinate, whereby radiation admitted by said light transmission means is displayed at said exit plane in parallel non-overlapping spectral bands.

20. The polychromator set forth in claim 19, wherein the center-to-center distance between said column coordinates is equal to the horizontal dimension of said display means, and wherein said portions of said light transmission means are retained at locations of said array so that no two of said portions are aligned with the same column coordinate.

21. A polychromator according to claim 19, including lens means situated between said light source and said light transmission means for enhancing the light-collecting capacity of said light transmission means.

22. The polychromator set forth in claim 19, further comprising:
means included in said entrance means for slidably retaining said portions of said light transmission means for movement parallel to said entrance focal plane so that said portions can be moved to different locations in said array to adjust the positions of said parallel spectral bands and to select different spectral windows for display.

23. The polychromator set forth in claim 22, wherein said slidable retaining means includes a track disposed adjacent to said entrance focal plane and running diagonally across said plane, and means for mounting said portions of said light transmission means for movement along said track to permit the positioning of said portions at said different array locations.

24. The polychromator set forth in claim 19, wherein said entrance means includes aperture means providing an entrance slit for each of said portions of said light transmission means, and wherein said spectrum means includes dispersion means for focusing a selected range of spectral components on said display means for each said entrance slit.

25. The polychromator set forth in claim 24, wherein said dispersion means comprises a Rowland Circle apparatus having cylindrical sidewall means supporting said entrance means and said display means at adjacent positions thereon, and including means for separating radiation into spectral components supported on said sidewall means at a position opposite said entrance and display means.

26. The polychromator set forth in claim 24, wherein said aperture means comprises a slit plate affixed to said portions of said light transmission means.

27. A polychromator according to claim 19, including a plurality of spectral filters, with each of said filters being situated adjacent one of said portions of said light transmission means, said filters selectively excluding at least a portion of any radiation at wavelengths not included in the spectral band defined by the respective portion.

28. A polychromator according to claim 19, including a plurality of light shutters, with each of said shutters being situated adjacent one of said portions of said light transmission means for selectively stopping the light throughput of the respective portion.

29. A device for admitting light radiation into the entrance focal plane of a polychromator having means for transmitting radiation from a light source to said entrance plane, comprising a plate having means for retaining each of a plurality of portions of said light transmission means in any one of a plurality of locations in a predetermined array, each of said locations in said array being defined by column and row coordinates in a fixed rectilinear matrix located in said entrance plane, said column and row coordinates being separated by predetermined distances.

30. The device set forth in claim 29, further comprising means for slidably retaining said portions of said light transmission means for movement parallel to said entrance plane so that said portions can be moved to different locations in said array.

31. The device set forth in claim 30, wherein said slidable retaining means includes a track disposed adjacent to said entrance plane and running diagonally across said different array locations.

32. The device set forth in claim 29, further comprising aperture means providing an entrance slit for each of said portions of said light transmission means.

33. The device set forth in claim 32, wherein said aperture means comprises a slit plate affixed to said portions of said light transmission means.

34. The device set forth in claim 29, further comprising spectral filter means situated adjacent said portions of said light transmission means, said filter means selectively excluding at least a portion of any radiation at wavelengths not included in the spectral band defined by the respective portion.

35. The device set forth in claim 29, further comprising light shutter means situated adjacent said portions of said light transmission means for selectively stopping the light throughput of the respective portion.

* * * * *